Dec. 12, 1961  J. W. MEULENDYK  3,012,579
ELECTROHYDRAULIC SERVO VALVE

Filed June 8, 1959  2 Sheets-Sheet 1

INVENTOR.
JOHN W. MEULENDYK
BY
ATTORNEY 3,012,579
ELECTROHYDRAULIC SERVO VALVE
John W. Meulendyk, Kalamazoo, Mich., assignor, by mesne assignments, to Pneumo Dynamics Corporation, Cleveland, Ohio, a corporation of Delaware
Filed June 8, 1959, Ser. No. 818,725
9 Claims. (Cl. 137—623)

This invention relates to an electrohydraulic servo valve and more particularly to a new and improved valve which will provide operating stability over wide ranges of system pressures.

It is an important object of this invention to provide an electrohydraulic control device which accurately regulates fluid flow in response to an electric signal.

It is another object of this invention to provide an electrohydraulic flow control valve which is substantially insensitive to variations in supply pressure.

It is still another object of this invention to provide an electrohydraulic servo valve operated by the pressure drop across a variable orifice wherein the flow through the variable orifice does not affect the sensitivity of the valve.

Further objects and advantages will appear from the following description and drawings, wherein.

Figure 1:
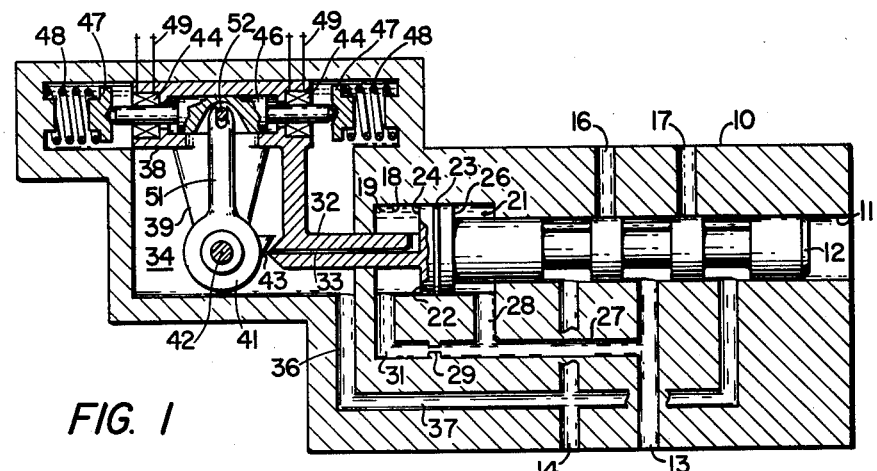
FIGURE 1 is a longitudinal section of an electrohydraulic servo valve incorporating this invention illustrating the valve in the neutral or off position when no signal is applied to the valve.

The servo valve according to this invention is shown as applied to a four-way spool valve. However, it should be understood that the structure of the power stage valve could be of any known type. The valve includes a body 10 formed with a valve bore 11 in which a valve spool or member 12 is axially movable. An inlet port 13 is adapted to be connected to an external source of pressure and a reservoir return port 14 is adapted to be connected to the reservoir. A pair of controlled ports 16 and 17 are formed in the valve body 10 and are isolated from both the inlet and return ports 13 and 14 when the spool 12 is in the off position of FIGURE 1. Movement of the spool 12 in either direction from the off position of FIGURE 1 operates to connect one of the controlled ports 16 or 17 to the inlet 13 and the other of the controlled ports to the return port 14. This portion of the valve is a conventional four-way spool valve which can be used to control hydraulic actuators or any other type of suitable hydraulic devices.

In order to control the position of the spool 12, an enlarged bore 18 is provided in the valve body 10 which is divided into first and second chambers 19 and 21 by a piston head 22 formed on the spool 12. A seal 23 is mounted on the piston head 22 to provide sealing engagement between the wall of the bore 18 and the piston head 22. The face 24 of the piston head 22 defining part of the first chamber 19 is acted upon by fluid under pressure within the first chamber 19 to produce an axial force urging the spool 12 to the right. Similarly, the face 26 of the piston head 22 defining a part of the second chamber 21 is acted upon by fluid under pressure in that chamber to produce an axial force urging the spool 12 to the left. The inlet port 12 is connected to the second chamber 21 through passages 27 and 28 so the second chamber 21 is always maintained at supply pressure and a force is developed on the face 26 urging the spool 12 to the left. The first chamber 19 is also connected to the inlet port 13 through the passage 27, a fixed flow restriction 29, and a passage 31. When flow is maintained into the first chamber 19, a pressure drop occurs through the flow restriction 29 so the first chamber 19 is maintained at a pressure below the pressure of the inlet port 13. The exact value of this pressure is determined by the rate of flow which is controlled in a manner discussed below. The area of the face 24 is larger than the area of the face 26 so that the axial forces developed by the pressures in the two chambers 19 and 21 will be balanced when a predetermined relationship exists between the pressures in the two chambers even though the pressure in the chamber 19 is always less than the pressure in the chamber 21.

The spool 12 is formed with an extension 32 provided with a passage 33 open to a cavity 34 formed in the body 10. The cavity 34 is in turn maintained at return pressure by a fluid connection through the passages 36 and 37. Integrally formed on the extension 32 is a torque motor housing 38 and a cam support projection 39. A cam 41 is pivoted on the cam support 39 for rotation relative thereto about a pivot axis 42 which is directly in alignment with the passage 33 in the spool valve extension 32. The cam 41 is formed with a metering face 43 adjacent to the outer end of the passage 33 and co-operates therewith to form a variable orifice or flow restriction. When the cam 41 is rotated about its pivot 42, the spacing between the metering face 43 and the end of the passage 33 varies to change the resistance to flow out of the first chamber 19.

Rotation of the cam 41 in a clockwise direction, as viewed in the drawings, reduces the spacing and increases the resistance to flow causing a decrease in the flow rate thruogh the passage 33 and the fixed flow restriction 29 and, as a result, an increase of the pressure in the first chamber 19. Conversely, rotation of the cam 41 in a counterclockwise direction increases the spacing between the metering face 43 and the end of the passage 33 resulting in an increase in flow through the fixed flow restriction 29 which reduces the pressure in the first chamber 19.

The various portions are arranged so that when the cam 41 is in the position of FIGURE 1 the pressure in the first chamber 19 times the area of the face 24 is equal to the pressure in the second chamber 21 times the area of the face 26. Therefore, when the cam 41 is in the neutral position of FIGURE 1, the axial forces developed on the spool 12 by the fluid under pressure in the two chambers 19 and 21 are balanced and the spool 12 remains stationary. However, if the cam 41 is rotated in a counterclockwise direction, a decrease in the pressure in the first chamber 19 occurus so that the axial force on the face 24 is smaller than the axial force on the face 26 and the spool 12 shifts to the left. Conversely, rotation of the cam 41 in a clockwise direction results in an increase in the pressure of the first chamber 19 and produces a right-hand movement in the spool 12.

A torque motor is provided within the torque motor housing 38 which includes a stator or coils 44 and an armature 46. The coils 44 are mounted in the torque motor 38 and the armature 46 is supported for axial movement in a direction parallel to the direction of movement of the spool 12. A spring retainer 47 is positioned at each end of the armature 46. Opposed springs 48 extend between the body 10 and each of the spring retainers 47 and operate to produce opposing axial forces on the armature 46 which are balanced when the armature is in the position of FIGURE 1.

When an electrical signal is supplied to the coils 46 through electrical connections 49, a force is developed on the armature 46 urging it axially relative to the coils 44 and torque motor housing 38. This electrically induced forcre results in movement of the armature 46 to a new position at which time the net forces, including the electrical and spring forces on the armature, are balanced. The force causing displacement of the armature 46 from the neutral position of FIGURE 1 is a direct function of the electrical signal applied through the electrical connections 49.

The cam 41 is connected to the armature 46 by a slotted arm 51 which engages a cross pin 52 mounted on the armature 46. Therefore, when the armature 46 shifts to the right relative to the torque motor housing 38, the cam 41 is rotated in a clockwise direction. Conversely, when the armture 46 moves to the left relative to the torque motor housing 38, the cam 41 is rotated in a counterclockwise direction.

Figure 2:
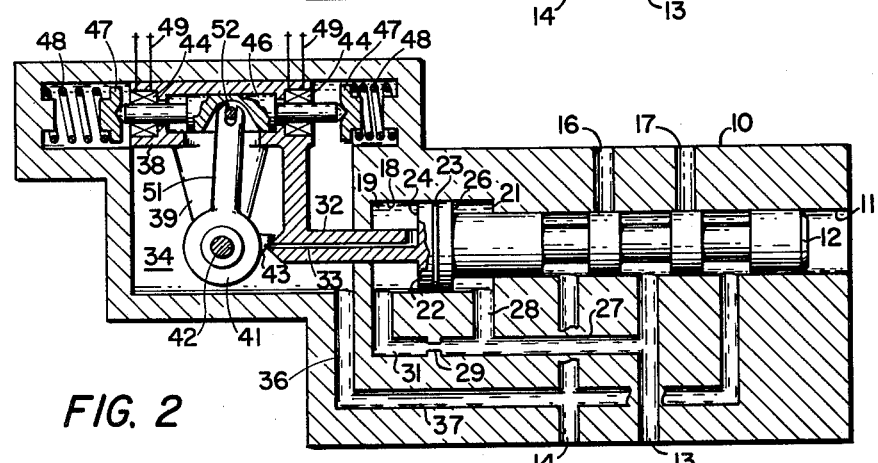
FIGURE 2 is a view similar to FIGURE 1 showing the operation of the valve at the moment an electric signal is applied before the valve spool shifts.
Figure 3:
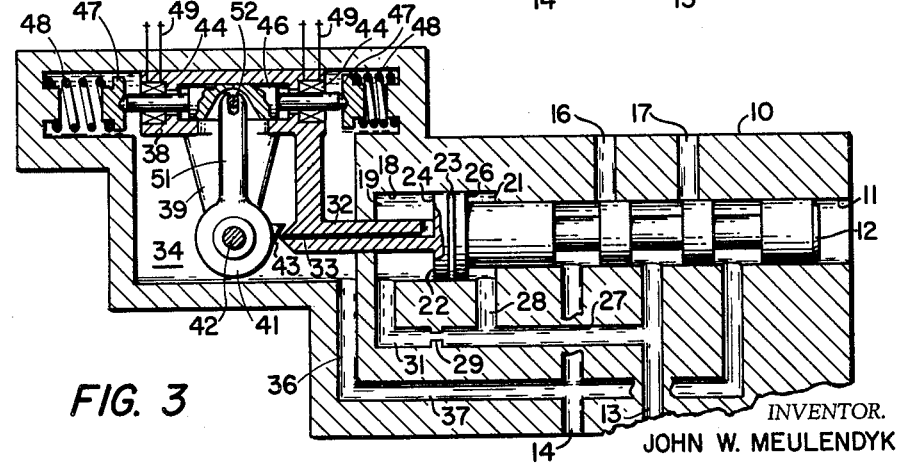
FIGURE 3 is a view similar to FIGURES 1 and 2 illustrating the positions the elements assume when equilibrium is reached in an operated position in response to an electric signal.

In operation, when an electrical signal is supplied to the coils 44 in a manner which causes the armature 46 to shift to the right to the position shown in FIGURE 2, the cam 41 is rotated in a clockwise direction which moves the metering face 43 closer to the end of the passage 33. This causes an increase in the resistance to flow through the passage 33 and results in an increase in pressure in the first chamber 19. In FIGURE 2, the elements are shown in the position they assume when the armature 46 has been displaced by the electrical signal and has rotated the cam 41 but before the spool 12 shifts. The increase in the pressure in the first chamber 19 causes an unbalanced condition to occur and results in a right-hand movement of the spool 12 to the operated position of FIGURE 3. Because the torque motor housing 38 is integrally formed with the spool 12, movement of the spool 12 to the right moves the torque motor housing 38 and the torque motor coil 44 to the right and re-establishes the original position relationship of the armature 46 and the coils 44. The spool movement results in a counterclockwise rotation of the cam 41 which re-establishes the initial or balancing position of the variable restriction. Therefore, the spool 12 returns to equilibrium in a displaced operated position as shown in FIGURE 3 wherein the spool 12 is displaced from its neutral position by a distance equal to the displacement of the armature 46 from its neutral position. The elements will remain in the operated position as long as the signal supplied to the coils 44 is not changed. If the signal is removed, the armature 46 is returned to its initial position by the right spring 48 and will result in a movement of the spool 12 back to its original position. When the electrical signal is removed, the springs 48 return the armature to its original position. This rotates the cam 41 in a counter-clockwise direction and causes the spool 12 to return to the neutral position. If an opposite signal is applied to the coils, the spool 12 will shift to the left in a similar manner.

It should be noted that the displacement of the armature 46 is a direct function of the signal applied since there are no forces acting on the armature other than the forces of the springs 48 and the electrically induced forces created by the signals. Because the cam 41 is pivoted on an axis 42 directly in alignment with the passage 33, the forces developed on the cam 41 due to the impinging stream of fluid passing through the passage 33 do not produce any reaction which can be transmitted back to the torque motor armature 46. Also, since the torque motor stator or coils 44 are mounted on the torque motor housing 38 and reach an equilibrium only when the relative position between the armature 46 and the coils 44 is returned to the original or neutral position, a high degree of sensitivity is developed. This is because a torque motor produces a force which is an exact function of the applied electrical signal only when the motor produces a force without relative displacement between the coils and armature. It is true that the armature is displaced relative to the coils during the initial operation but when equilibrium is reached, the original position relationship is re-established. Since the impinging stream of fluid on the cam 41 does not produce a force which is transmitted to the torque motor and since the torque motor must only produce a force rather than movement when equilibrium is reached, a servo mechanism is provided which operates to move the spool 12 to a position which is determined only by the signal applied to the torque motor and the calibration of the springs.

Figure 4:
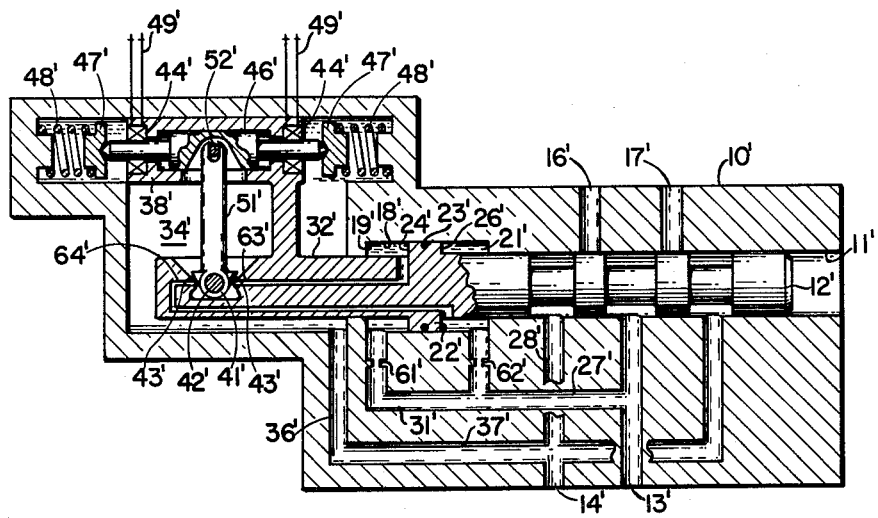
FIGURE 4 is a longitudinal section of a second embodiment of an electrohydraulic servo valve incorporating this invention using two opposed variable orifices.

In the second embodiment shown in FIGURE 4, a completely balanced system is provided. In this embodiment, similar reference numerals are used to designate similar parts but a prime (') is added to indicate that they refer to the second embodiment. The spool 12' is provided with a piston head 22' in a manner similar to the first embodiment. However, the areas of the two faces 24' and 26' are equal. In this embodiment, both the first chamber 19' and the second chamber 21' are connected to the inlet port 13' through fixed flow restrictions 61' and 62'. Also, both of the chambers 19' and 21' are connected to the cavity 34' through opposed aligned variable orifices 63' and 64' respectively. The opposed orifices are open adjacent to the cam 41' which is formed with similar opposed metering faces 43'. When the cam 41' is in the neutral position, an equal flow passes through both of the variable orifices 63' and 64' and through the fixed flow restrictions 61' and 62'. Therefore, the pressures in the two chambers 19' and 21' are equal and the spool 12' is in equilibrium. Movement of the cam 41' in a clockwise direction by the torque motor armature 46' results in an increase in pressure in the first chamber 19' and a decrease in pressure in the second chamber 21' which causes the spool 12' to shift to the right. This brings the cam 41' back to its neutral position in the same manner as discussed above in connection with the first embodiment and results in equilibrium being reached when the spool 12' has displaced from the neutral or off position by the same distance as that of the displacement of the armature 46'. In this embodiment, the pressures in the two chambers 19' and 21' are developed by identical means so the device is completely insensitive to variations of supply pressure. Here again, however, the pivot axis 42' is directly aligned with the opposed orifices 63' and 64' so the impinging force of the flow through the orifice does not result in a force being transmitted back to the torque motor. Also, the valve reaches equilibrium when the torque motor armature 46' and the torque motor housing 38' return to their initial position.

It should be understood that the invention has been disclosed in a schematic type structure to simplify the understanding of the invention. The electrical connections 49 would have to be arranged so that they permit movement of the torque motor housing 38 relative to the body 10. Either a slip joint or a loop in the electrical connections could be used to permit such freedom.

Although preferred embodiments of this invention are illustrated, it will be realized that various modifications of the structural details may be made without departing from the mode of operation and the essence of the in-

I claim:

1. A servo valve comprising a body, a valve member movable in said body to control fluid flow, a working surface on said member operable when exposed to fluid under pressure to produce a force tending to move said member, a source of fluid under pressure, a flow restriction, a fluid connection between said source and said surface through said restriction, an orifice in fluid communication with said surface, a cam pivoted for rotation about an axis substantially aligned with said orifice, a cam face on said cam adjacent to said orirfice proportioned to change the flow rate through said orifice upon rotation of said cam about its pivot axis, and an electric torque motor operable to rotate said cam in response to electrical signals.

2. A servo valve comprising a body, a valve member movable in said body to control fluid flow, a working surface on said member operable when exposed to fluid under pressure to produce a force to move said member, a source of fluid under pressure, a flow restriction, a fluid connection between said source and said surface through said restriction, an orifice in fluid communication with said surface, a cam pivoted on said member for rotation about an axis substantially aligned with said orifice, a cam face on said cam adjacent to said orifice proportioned to change the flow rate through said orifice upon rotation of said cam about its pivot axis, and an electric torque motor on said member operable to rotate said cam in response to electrical signals.

3. A servo valve comprising a body, a valve member movable in said body to control fluid flow, opposed working surfaces on said member operable when exposed to fluid under pressure to produce opposed forces on said member, a source of fluid under pressure, a flow restriction, a first fluid connection between said source and one of said surfaces through said restriction, a second fluid connection between said source and the other of said surfaces, an orifice in fluid communication with said one surface, a cam pivoted on said member for rotation about an axis substantially aligned with said orifice, a cam face on said cam adjacent to said orifice proportioned to change the flow rate through said orifice upon rotation of said cam about its pivot axis, and an electric torque motor operable to rotate said cam in response to electrical signals.

4. A servo valve comprising a body, a valve spool axially movable in said body to control fluid flow, opposed working surfaces on said spool operable when exposed to fluid under pressure to produce opposed axial forces on said spool, a source of fluid under pressure, a flow restriction, a first fluid connection between said source and one of said surfaces through said restriction, a second fluid connection between said source and the other of said surfaces, an axially directed orifice in fluid communication with said one surface, a cam pivoted on said spool for rotation about an axis substantially aligned with said orifice, a cam face on said cam adjacent to said orifice proportioned to change the flow rate through said orifice upon rotation of said cam about its pivot axis, and an electric torque motor including a stator on said spool and an armature connected to said cam operable to rotate said cam in response to electrical signals.

5. A servo valve comprising a body, a valve spool axially movable in said body to control fluid flow, opposed working surfaces on said spool operable when exposed to fluid under pressure to produce opposed axial forces on said spool, a source of fluid under pressure, a flow restriction, a first fluid connection between said source and one of said surfaces through said restriction, a second fluid connection between said source and the other of said surfaces, the area of said one surface being greater than the area of said other surface, an axially directed orifice in fluid communication with said one surface, a cam pivoted on said spool for rotation about an axis substantially aligned with said orifice, a cam face on said cam adjacent to said orifice proportioned to change the flow rate through said orifice upon rotation of said cam about its pivot axis, and an electric torque motor including a stator on said spool and an armature connected to said cam operable to rotate said cam in response to electrical signals.

6. A servo valve comprising a body, a valve spool axially movable in said body to control fluid flow, a piston head on said spool providing opposed working surfaces operable when exposed to fluid under pressure to produce opposed axial forces on said spool, a source of fluid under pressure, a flow restriction, a first fluid connection between said source and one of said surfaces through said restriction, a second fluid connection between said source and the other of said surfaces, the area of said one surface being greater than the area of said other surface, an axially directed orifice in fluid communication with said one surface, a cam pivoted on said spool for rotation about an axis substantially aligned with said orifice, a cam face on said cam adjacent to said orifice proportioned to change the flow rate through said orifice upon rotation of said cam about its pivot axis, and an electric torque motor including a stator on said spool and an armature connected to said cam operable to rotate said cam in response to electrical signals.

7. A servo valve comprising a body, a valve member movable in said body to control fluid flow, opposed working surfaces on said member operable when exposed to fluid under pressure to produce opposed forces on said member tending to move said member, a source of fluid under pressure, a pair of flow restrictions, a first connection between said source and one of said surfaces through one of said flow restrictions, a second connection between said source and the other of said surfaces through the other of said flow restrictions, opposed aligned orifices one communicating with each of said surfaces, a cam pivoted between said opposed orifices for rotation about an axis aligned with said orifices, a cam face on said cam adjacent to each of said orifices proportioned to change the flow rate therethrough upon rotation of said cam about its pivot axis, and an electric torque motor operable to rotate said cam in response to electrical signals.

8. A servo valve comprising a body, a valve member movable in said body to control fluid flow, opposed working surfaces on said member operable when exposed to fluid under pressure to produce opposed forces on said member tending to move said member, a source of fluid under pressure, a pair of similar flow restrictions, a first connection between said source and one of said surfaces through one of said flow restrictions, a second connection between said source and the other of said surfaces through the other of said flow restrictions, opposed aligned orifices one communicating with each of said surfaces, a cam pivoted between said opposed orifices for rotation about an axis aligned with said orifices, a cam face on said cam adjacent to each of said orifices proportioned to change the flow rate therethrough upon rotation of said cam about its pivot axis, an electric torque motor including a stator on said member and an armature connected to said cam operable to rotate said cam in response to electrical signals, and springs urging said armature toward a predetermined neutral position.

9. A servo valve comprising a body, a valve member movable in said body to control fluid flow, a piston head connected to said member providing equal opposed working surfaces operable when exposed to fluid under pressure to produce opposed forces on said member tending to move said member, a source of fluid under pressure, a pair of similar flow restrictions, a first connection between said source and one of said surfaces through one of said flow restrictions, a second connection between said source and the other of said surfaces through the other of said flow restrictions, opposed aligned orifices one communicating with each of said surfaces, a cam pivoted on said member between said opposed orifices for rotation about an axis aligned with said orifices, a cam face on said cam adjacent to each of said orifices proportioned to change the flow rate therethrough upon rotation of said cam about its pivot axis, an electric torque motor including a stator on said member and an armature connected to said cam operable to rotate said cam in response to electrical signals, and springs urging said armature toward a predetermined neutral position.

References Cited in the file of this patent

UNITED STATES PATENTS 2,797,666    Chubbuck _____ July 2, 1957